(12) United States Patent
Hsiao et al.

(10) Patent No.: US 8,947,828 B1
(45) Date of Patent: Feb. 3, 2015

(54) MAGNETIC HEAD HAVING A DOUBLE BUMP WRAP AROUND SHIELD

(71) Applicant: HGST Netherlands B.V., Amsterdam (NL)

(72) Inventors: Wen-Chien D. Hsiao, San Jose, CA (US); Na Young Kim, San Jose, CA (US); Terence T. L. Lam, Cupertino, CA (US); Yansheng Luo, Fremont, CA (US); Aron Pentek, San Jose, CA (US); Honglin Zhu, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/218,761

(22) Filed: Mar. 18, 2014

(51) Int. Cl.
*G11B 5/127* (2006.01)
(52) U.S. Cl.
USPC .................................. 360/125.15; 29/603.16
(58) Field of Classification Search
CPC ..... G11B 5/3116; G11B 5/1278; G11B 5/315
USPC ............. 360/119.02–119.04, 125.03, 125.07, 360/125.11, 125.15, 125.3, 125.71; 29/603.12–603.16
See application file for complete search history.

(56) References Cited

U.S. PATENT DOCUMENTS

| | | | |
|---|---|---|---|
| 5,331,487 A | 7/1994 | Gregory et al. | |
| 5,718,942 A | 2/1998 | Vurens et al. | |
| 6,099,937 A | 8/2000 | Gui et al. | |
| 7,249,407 B2 * | 7/2007 | Kobayashi | 29/603.14 |
| 7,354,666 B2 | 4/2008 | Liu et al. | |
| 7,968,505 B2 | 6/2011 | Liu et al. | |
| 7,995,307 B2 * | 8/2011 | Zheng | 360/125.13 |
| 8,345,384 B1 * | 1/2013 | Sasaki et al. | 360/125.15 |
| 8,347,488 B2 * | 1/2013 | Hong et al. | 29/603.16 |
| 8,422,168 B2 * | 4/2013 | Hsiao et al. | 360/125.07 |
| 8,441,757 B2 * | 5/2013 | Chen et al. | 360/125.13 |
| 8,630,064 B2 * | 1/2014 | Maeda et al. | 360/125.3 |
| 8,699,183 B2 * | 4/2014 | Sahoo et al. | 360/125.03 |
| 8,724,258 B2 * | 5/2014 | Zhang et al. | 360/119.04 |
| 8,724,259 B1 * | 5/2014 | Liu et al. | 360/125.15 |
| 8,797,686 B1 * | 8/2014 | Bai et al. | 360/125.15 |
| 2005/0037932 A1 | 2/2005 | Liu et al. | |
| 2012/0021253 A1 | 1/2012 | Nakata et al. | |

OTHER PUBLICATIONS

Guo et al., "A multidentate lubricant for use in hard disk drives at sub-nanometer thickness," Journal of Applied Physics, vol. 111, No. 2, pp. 024503-024503-7, Jan. 2012 (abstract only).

(Continued)

*Primary Examiner* — Angel Castro
(74) *Attorney, Agent, or Firm* — Zilke-Kotab, PC (57) ABSTRACT

In one embodiment, an apparatus includes a main pole, at least one side shield positioned on sides of the main pole, and a trailing shield having a multi-bump structure positioned near a trailing side of the main pole, wherein the multi-bump structure has six junctures along the trailing shield facing the main pole, a first juncture positioned at a media-facing surface, a sixth juncture positioned away from the media-facing surface, and second, third, fourth, and fifth junctures positioned along the side of the trailing shield facing the main pole between the first and sixth juncture, wherein an element height of a first face of the trailing shield positioned between the fourth and fifth juncture is less than an element height of a second face of the trailing shield positioned at an end of the trailing shield positioned opposite the media-facing surface of the trailing shield.

20 Claims, 10 Drawing Sheets

(56) References Cited

OTHER PUBLICATIONS

Marchon et al., "Fomblin Multidentate Lubricants for Ultra-low Magnetic Spacing," Magnetics Conference, 2006, Intermag 2006, IEEE International, pp. 416, May 8-12, 2006 (abstract only).

Kawaguchi et al., "An effect of dewetting of lubricated surfaces on friction and wear properties," Journal of Applied Physics, vol. 97, No. 10, pp. 10P311-10P311-3, May 2005 (abstract only).

Yansheng et al., "Lubricant transfer from disk to slider in hard disk drives," Applied Physics Letter, vol. 90, No. 14, pp. 143516-143516-3, Apr. 2007 (abstract only).

Bai et al., "High Density Perpendicular Recording With Wrap-Around Shielded Writer," Magnetics, IEEE Transactions, vol. 46, Issue 3, pp. 722-729, Mar. 2010 (abstract only).

Hitachi Technology, "Research & Development," pp. 75-86, 2009-2010.

* cited by examiner

MAGNETIC HEAD HAVING A DOUBLE BUMP WRAP AROUND SHIELD

FIELD OF THE INVENTION

The present invention relates to data storage systems, and more particularly, this invention relates to a magnetic head having a wrap around shield which exhibits a double bump structure.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. The main pole of a magnetic head is used to deliver flux to a recording medium, thereby flipping the magnetic orientation of bits within the recording medium. The stronger the flux is, the easier it is to flip the bit, thereby allowing data to be recorded to the recording medium more easily.

However, when the main pole is not shielded effectively, the flux may be delivered to bits in a track adjacent to the track on which the bit is being recorded causing these bits in the adjacent track to unintentionally flip, referred to as adjacent track interference (ATI). Also, the flux may be delivered to bits in a track located some distance from the track on which the bit is being recorded and may cause these bits to unintentionally flip, referred to as far track interference (FTI).

SUMMARY

In one embodiment, an apparatus includes a main pole, at least one side shield positioned near one or more sides of the main pole in a cross-track direction, and a trailing shield positioned near a trailing side of the main pole, wherein the trailing shield includes a multi-bump structure having at least six trailing junctures on a side of the trailing shield facing the main pole, each trailing juncture defining a region where two surfaces of the trailing shield are joined, wherein a first trailing juncture is positioned at a media-facing surface of the trailing shield, a sixth trailing juncture is positioned away from the media-facing surface of the trailing shield, and second, third, fourth, and fifth trailing junctures are positioned along the side of the trailing shield facing the main pole between the first trailing juncture and the sixth trailing juncture, wherein a first face of the trailing shield is positioned between the fourth trailing juncture and the fifth trailing juncture, wherein a second face of the trailing shield is positioned at an end of the trailing shield positioned opposite the media-facing surface of the trailing shield, and wherein an element height of the first face of the trailing shield is less than an element height of the second face.

In another embodiment, a magnetic head includes a main pole, at least one side shield positioned near one or more sides of the main pole in a cross-track direction, and a trailing shield positioned near a trailing side of the main pole, wherein the at least one side shield includes a multi-bump structure having at least five side junctures on a side of the at least one side shield facing the main pole, each side juncture defining a region where two surfaces of the at least one side shield are joined, wherein a first side juncture is positioned at a media-facing surface of the at least one side shield, a fifth side juncture is positioned away from the media-facing surface of the at least one side shield, and second, third, and fourth side junctures are positioned along the side of the at least one side shield facing the main pole between the first side juncture and the fifth side juncture, wherein a first face of the at least one side shield is positioned between the third side juncture and the fourth side juncture, wherein a second face of the at least one side shield is positioned at an end of the at least one side shield positioned opposite the media-facing surface of the at least one side shield, and wherein an element height of the first face of the at least one side shield is less than an element height of the second face of the at least one side shield.

In yet another embodiment, a method for forming a magnetic head includes forming a main pole, forming a bump layer above the main pole, forming at least one side shield above the bump layer near one or more sides of the main pole in a cross-track direction, and forming a trailing shield above the bump layer near a trailing side of the main pole, wherein the bump layer is positioned near a pole tip of the main pole commensurate with the trailing shield and the at least one side shield, and wherein the bump layer is configured to provide a multi-bump structure to at least one of: the at least one side shield, and the trailing shield.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, an apparatus includes a main pole, at least one side shield positioned near one or more sides of the main pole in a cross-track direction, and a trailing shield positioned near a trailing side of the main pole, wherein the trailing shield includes a multi-bump structure having at least six trailing junctures on a side of the trailing shield facing the main pole, each trailing juncture defining a region where two surfaces of the trailing shield are joined, wherein a first trailing juncture is positioned at a media-facing surface of the trailing shield, a sixth trailing juncture is positioned away from the media-facing surface of the trailing shield, and second, third, fourth, and fifth trailing junctures are positioned along the side of the trailing shield facing the main pole between the first trailing juncture and the sixth trailing juncture, wherein a first face of the trailing shield is positioned between the fourth trailing juncture and the fifth trailing juncture, wherein a second face of the trailing shield is positioned at an end of the trailing shield positioned opposite the media-facing surface of the trailing shield, and wherein an element height of the first face of the trailing shield is less than an element height of the second face.

In another general embodiment, a magnetic head includes a main pole, at least one side shield positioned near one or more sides of the main pole in a cross-track direction, and a trailing shield positioned near a trailing side of the main pole, wherein the at least one side shield includes a multi-bump structure having at least five side junctures on a side of the at least one side shield facing the main pole, each side juncture defining a region where two surfaces of the at least one side shield are joined, wherein a first side juncture is positioned at a media-facing surface of the at least one side shield, a fifth side juncture is positioned away from the media-facing surface of the at least one side shield, and second, third, and fourth side junctures are positioned along the side of the at least one side shield facing the main pole between the first side juncture and the fifth side juncture, wherein a first face of the at least one side shield is positioned between the third side juncture and the fourth side juncture, wherein a second face of the at least one side shield is positioned at an end of the at least one side shield positioned opposite the media-facing surface of the at least one side shield, and wherein an element height of the first face of the at least one side shield is less than an element height of the second face of the at least one side shield.

In yet another general embodiment, a method for forming a magnetic head includes forming a main pole, forming a bump layer above the main pole, forming at least one side shield above the bump layer near one or more sides of the main pole in a cross-track direction, and forming a trailing shield above the bump layer near a trailing side of the main pole, wherein the bump layer is positioned near a pole tip of the main pole commensurate with the trailing shield and the at least one side shield, and wherein the bump layer is configured to provide a multi-bump structure to at least one of: the at least one side shield, and the trailing shield.

Figure 1:
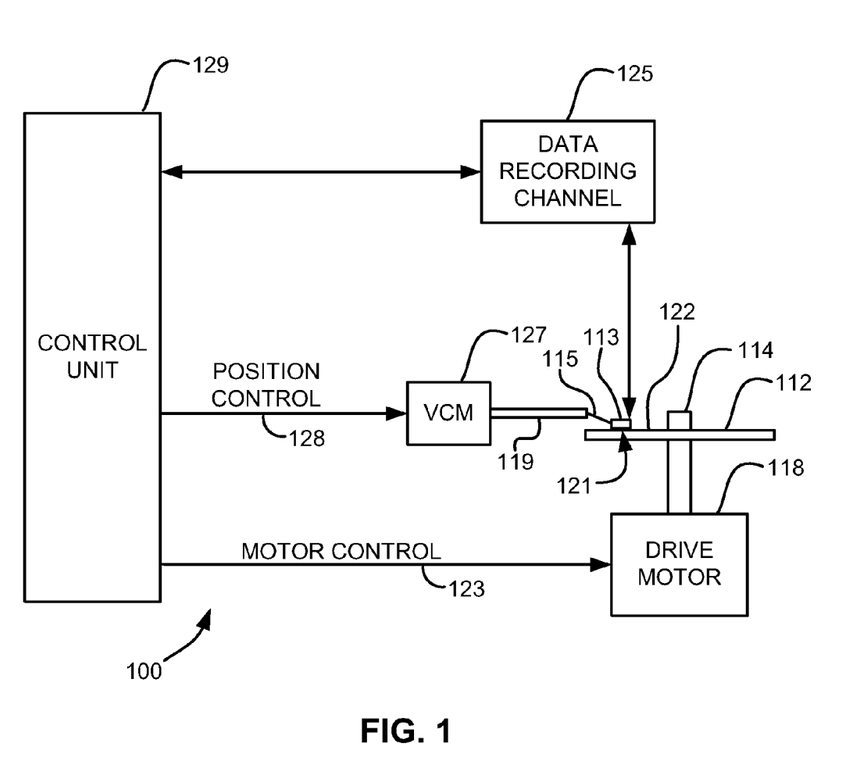
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers of the write portion by a gap layer at or near a media facing side of the head (sometimes referred to as an ABS in a disk drive). The pole piece layers may be connected at a back gap. Currents are conducted through the coil layer, which produce magnetic fields in the pole pieces. The magnetic fields fringe across the gap at the media facing side for the purpose of writing bits of magnetic field information in tracks on moving media, such as in circular tracks on a rotating magnetic disk.

The second pole piece layer has a pole tip portion which extends from the media facing side to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
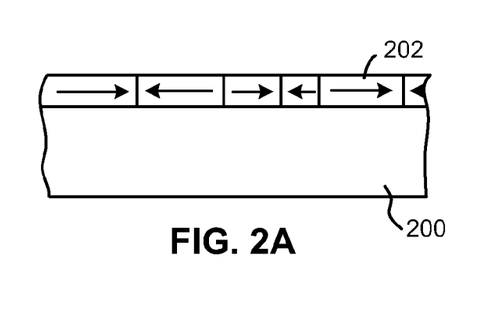
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
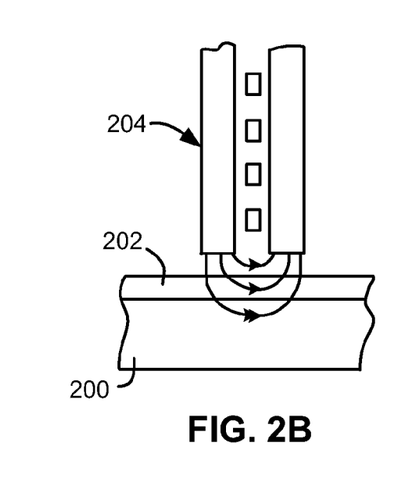
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figure 2C:
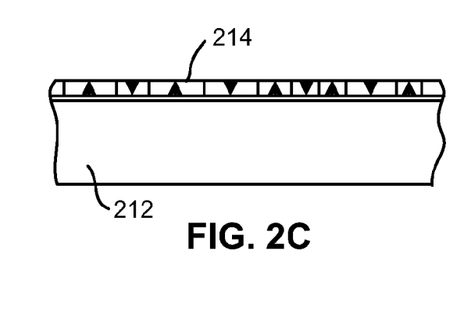
FIG. 2C is a magnetic recording medium utilizing a perpendicular recording format.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
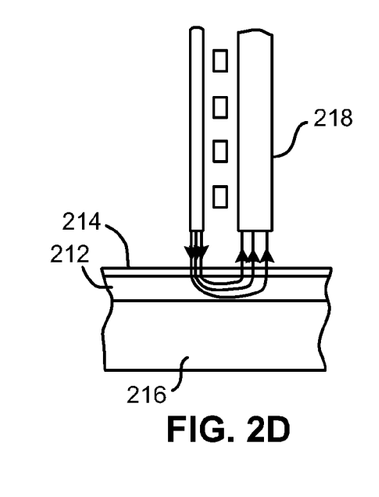
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

Figure 2E:
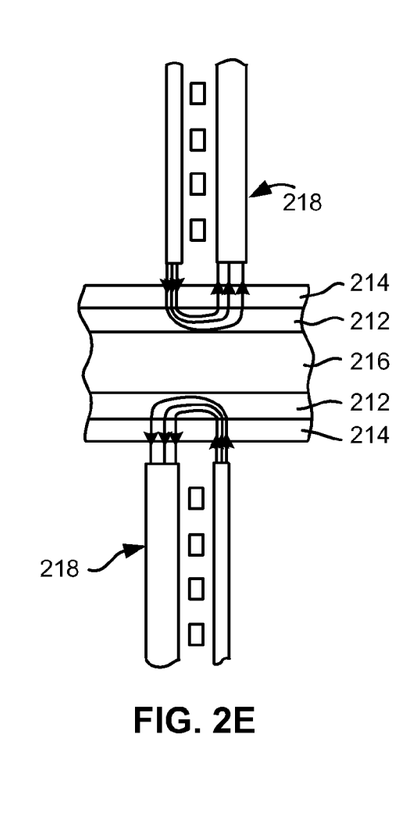
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
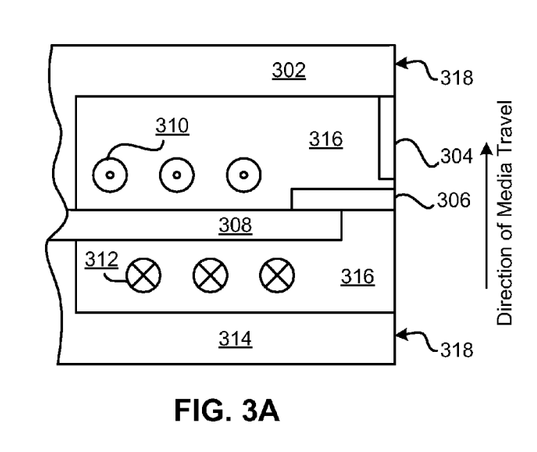
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the media facing side 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the media facing side 318. The media facing side 318 is indicated across the right side of the structure.

Perpendicular writing is achieved by forcing flux through the stitch pole 308 into the main pole 306 and then to the surface of the disk positioned towards the media facing side 318.

Figure 3B:
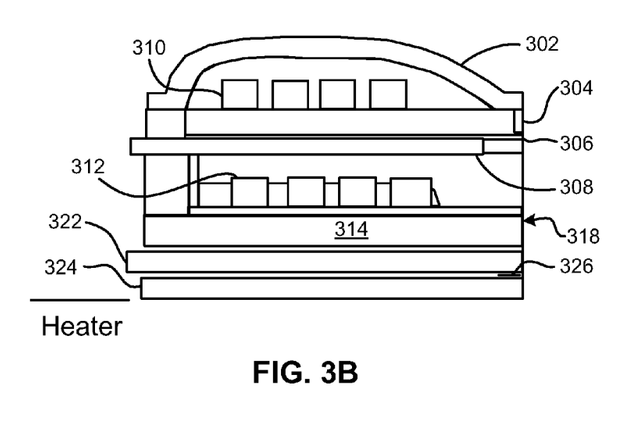
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4A:
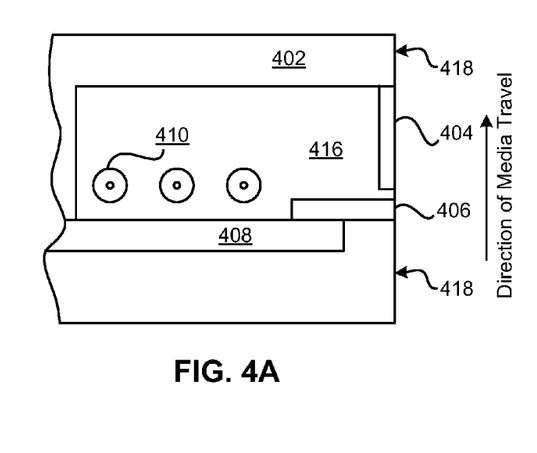
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the media facing side 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the media facing side 418). The media facing side 418 is indicated across the right side of the structure. The trailing shield 404 may be in contact with the main pole 406 in some embodiments.

Figure 4B:
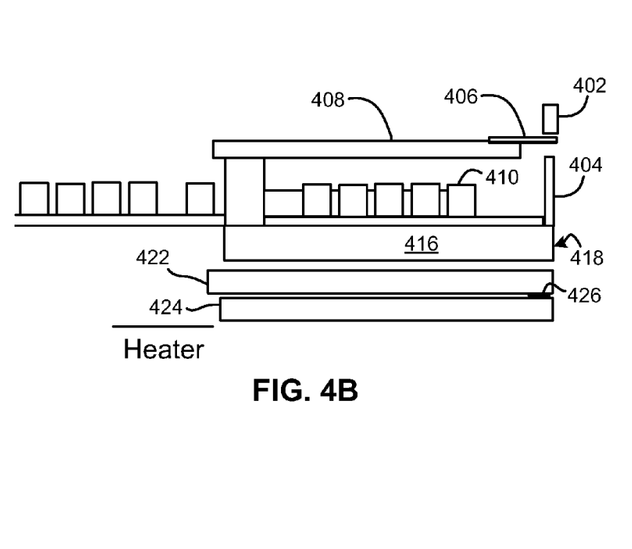
FIG. 4B is a cross-sectional view of one particular embodiment of a piggyback magnetic head with looped coils.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown away from the media facing side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Except as otherwise described herein, the various components of the structures of FIGS. 3A-4B may be of conventional materials and design, as would be understood by one skilled in the art.

Figure 5:
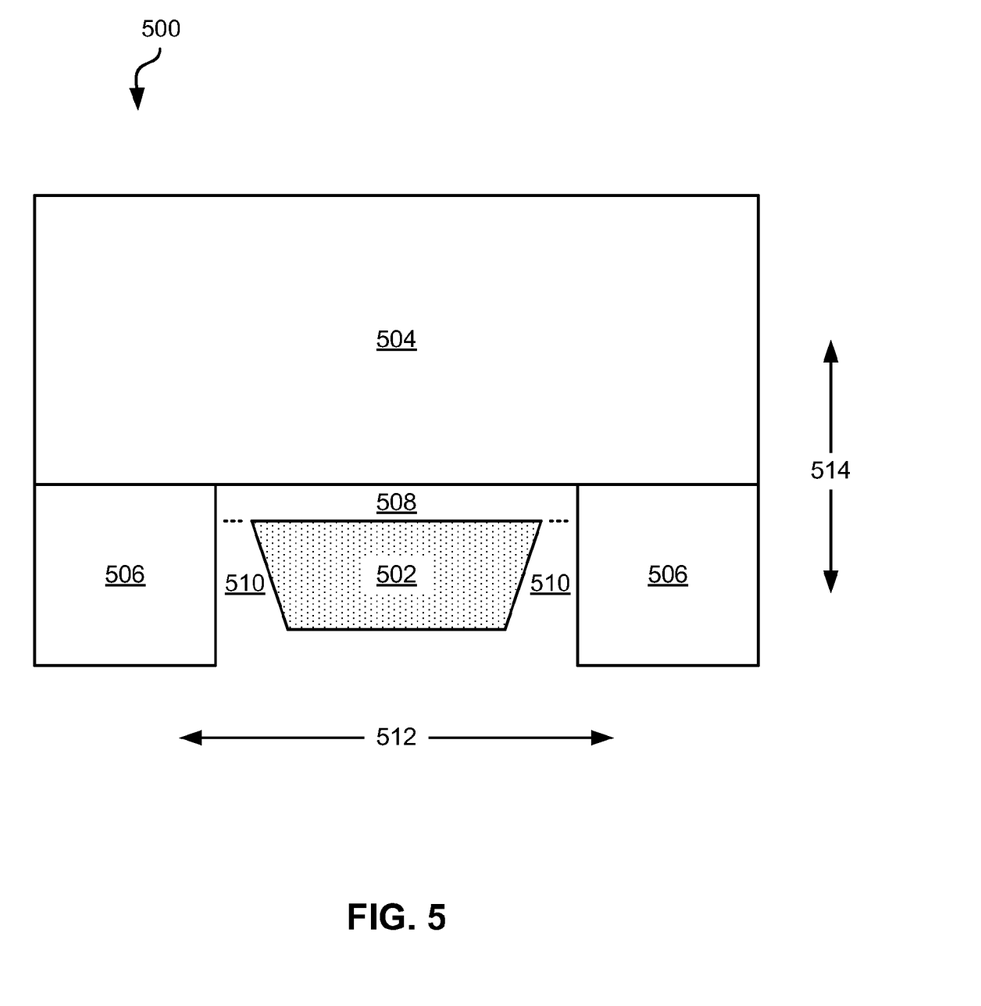
FIG. 5 shows a portion of a magnetic head from a media-facing surface thereof, according to one embodiment.

Now referring to FIG. 5, a portion of a magnetic head 500 is shown from a media-facing surface thereof, according to one embodiment. The magnetic head 500 includes a main pole 502 configured to deliver magnetic flux to a magnetic medium, a trailing shield 504 positioned near a trailing side of the main pole 502, and at least one side shield 506 positioned near one or more sides of the main pole 502 in a cross-track direction 512. The at least one side shield 506 is configured to shunt the magnetic flux from the main pole 502 to help alleviate adjacent track interference (ATI). However, too much magnetic flux entering the at least one side shield 506 may excessively excite the magnetic domain and cause far track interference (FTI). The trailing shield 504 is configured to improve the write field gradient of a magnetic field from the main pole for a better (increased) recoding density. Similarly, too much magnetic flux entering the trailing shield 504 may cause FTI. Therefore, the trailing shield 504 and the at least one side shield 506 should be properly designed to alleviate risk of FTI from occurring.

In more embodiments, the magnetic head 500 may also include a trailing gap 508 positioned between the trailing shield 504 and the main pole 502 on the trailing side of the main pole 502, and at least one side gap 510 positioned between the at least one side shield 506 and the main pole 502 on the one or more sides of the main pole 502 in the cross-track direction 512. The cross-track direction 512 is oriented perpendicular to the down-track direction 514 (along a direction of medium travel across the media-facing surface of the magnetic head 500). The cross-track direction 512 and the down-track direction 514 are also oriented parallel to the media-facing surface of the magnetic head 500.

In one embodiment, the trailing gap 508 and/or the at least one side gap 510 may comprise a non-magnetic insulating material, possibly a material having a high electrical resistivity in comparison with CoFe, such as alumina, MgO, $Ta_2O_5$, $Al_2O_3$, etc.

In another embodiment, electroless nickel may be used for either or both of the trailing gap 508 and/or the at least one side gap 510, the electroless nickel comprising a nickel alloy, such as NiP, NiB, NiPX, where X is one or more of Cu, W, Mo, Sn, etc.

In one embodiment, as shown in FIG. 5, the magnetic head 500 may comprise two side shields 506, with a side shield 506 positioned near each side of the main pole 502 in the cross-track direction 512. Of course, this is not required, and the magnetic head 500 may comprise only one side shield 506 positioned on either side of the main pole 502 in the cross-track direction 512 in another approach. This may be useful for shingled recording, where a corner of the main pole 502 is relied upon for producing flux toward the magnetic medium.

In a further embodiment, the two side shields 506 and the trailing shield 504 together may form a wrap around shield. Furthermore, the two side shields 506 and the trailing shield 504 may be formed in a single processing step, such that they comprise the same magnetic material, such as a soft magnetic material. In various embodiments, the shields may comprise CoFe, CoFePt, NiFe, or any other suitable material known in the art.

In accordance with another embodiment, a leading shield (not shown) and a leading gap (not shown) may be provided below the main pole 502, the leading shield being configured to shunt the magnetic flux from the main pole 502 during writing operations. Any suitable material and formation technique may be used to form the leading shield and the leading gap, as would be known to one of skill in the art.

Figure 6A:
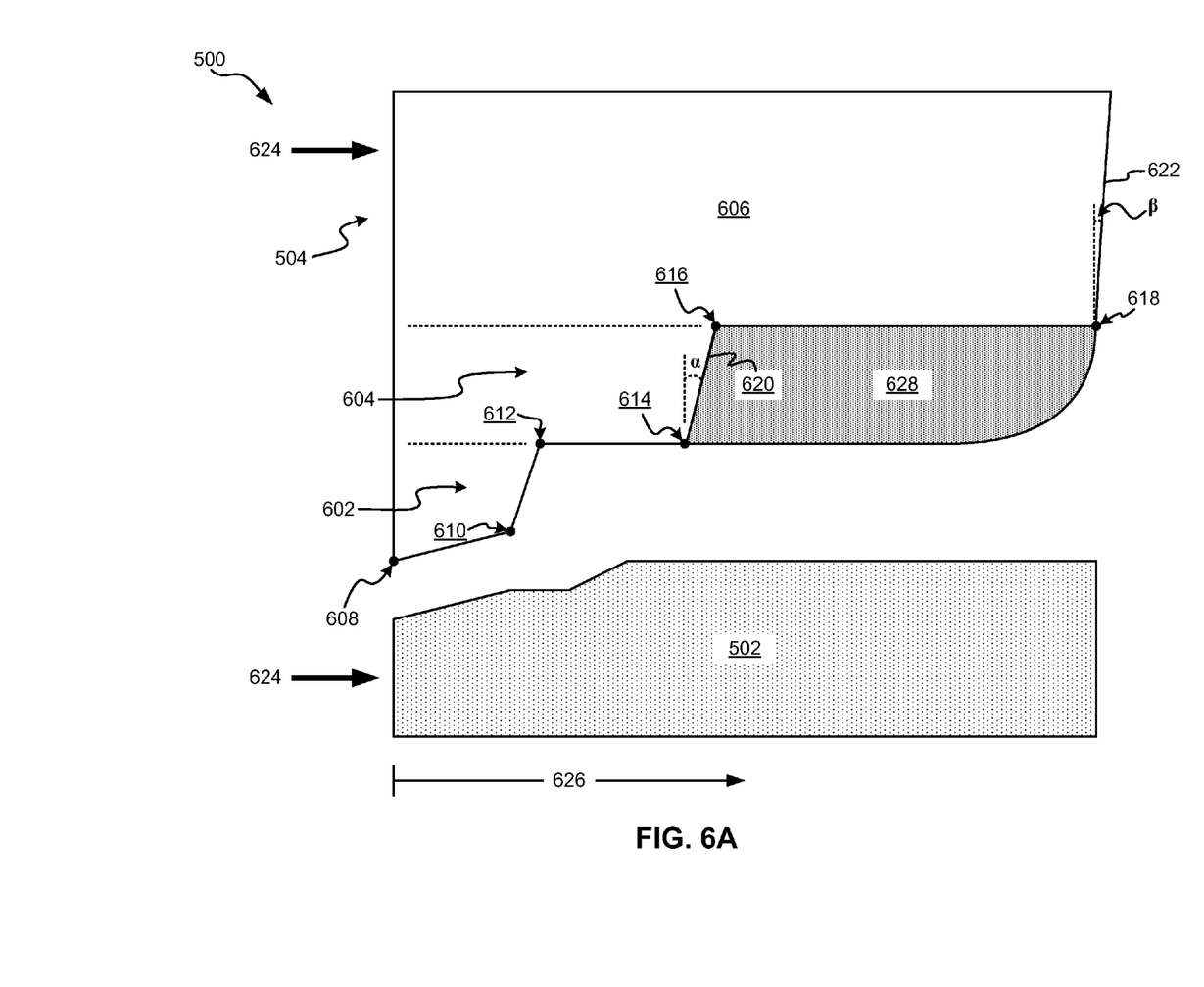
FIG. 6A shows a cross-section of a portion of a magnetic head near a side thereof, according to one embodiment.

According to one embodiment, as shown in FIG. 6A, the trailing shield 504 may comprise a multi-bump structure having at least six trailing junctures on a side of the trailing shield 504 facing the main pole 502, each trailing juncture defining a region or a point where two surfaces of the trailing shield 504 are joined, intersect, connect, etc. Note that while the junctures are shown as sharp corners, in practice, one or more of the junctures may have a rounded profile such that each juncture joins two surfaces of the trailing shield 504 in a smooth transition.

With continued reference to FIG. 6A, the first trailing juncture 608 may be positioned at a media-facing surface 624 of the trailing shield 504, the sixth trailing juncture 618 may be positioned away from the media-facing surface 624 of the trailing shield 504, and the second trailing juncture 610, third trailing juncture 612, fourth trailing juncture 614, and fifth trailing juncture 616 may be positioned along the side of the trailing shield 504 facing the main pole 502 between the first trailing juncture 608 and the sixth trailing juncture 618.

Also, in this embodiment, a first face 620 of the trailing shield 504 may be positioned between the fourth trailing juncture 614 and the fifth trailing juncture 616, and a second face 622 of the trailing shield 504 may be positioned at an end of the trailing shield 504 positioned opposite the media-facing surface 624 of the trailing shield 504. Furthermore, in some approaches, an element height (in the element height direction 626) of the first face 620 of the trailing shield 504 may be less than an element height of the second face 622.

Of course, due to manufacturing process variability and inherent difficulties in forming exact shapes, the first face 620 of the trailing shield 504 may have some angle α with respect to the media-facing surface 624 of the trailing shield 504, such as an angle α from about 0° to about 20°, or more or less, in some approaches. In other embodiments, the second face 622 of the trailing shield 504 may have some angle β with respect to the media-facing surface 624 of the trailing shield 504, such as an angle β from about 0° to about 20°, or more or less, in some approaches. In one embodiment, both angle α and angle β may be about 0° and within some manufacturing tolerance thereof.

As shown in FIG. 6A, the shape of the multi-bump structure of the trailing shield 504 may have a foot portion 602 positioned near or at the media-facing surface 624 of the trailing shield 504 in a direction toward the main pole 502, a first bump portion 604 from which the foot portion 602 extends, and a second bump portion 606 positioned farther from the main pole 502 than the first bump portion 604.

The foot portion 602 may be defined by the media-facing surface 624 of the trailing shield 504, the first trailing juncture 608, the second trailing juncture 610, and the third trailing juncture 612. Additionally, the first bump portion 604 may be defined by the third trailing juncture 612, the fourth trailing juncture 614, and the fifth trailing juncture 616. Furthermore, the second bump portion 606 may be defined by the fifth trailing juncture 616, the sixth trailing juncture 618, and an end opposite the media-facing surface 624 of the trailing shield 504. The second bump portion 606 may include the second face 622 positioned in a direction near to or substantially parallel with the media-facing surface 624 of the trailing shield 504 and positioned at an end of the trailing shield 504 opposite the media-facing surface 624 thereof.

A bump layer 628 may be provided below the trailing shield 504 along a side thereof positioned toward the main pole 502, and may act to help form the stepped multi-bump structure of the trailing shield 504, in one embodiment, and particularly the second bump portion 606. The bump layer 628 may comprise any non-magnetic insulating material, such as alumina, MgO, $Ta_2O_5$, etc.

In another embodiment, electroless nickel may be used for the bump layer 628, the electroless nickel comprising a nickel alloy, such as NiP, NiB, NiPX, where X is one or more of Cu, W, Mo, Sn, etc., such that the bump layer 628 may be plated onto the gap layer therebelow.

In one approach, part of the trailing shield 504 may be oriented parallel to a trailing side of a throat of the main pole 502 (positioned below the flare point of the main pole 502 in the element height direction 626) positioned closest to the media-facing surface 624 of the main pole 502.

In one embodiment, the first face 620 may be positioned farther from the media-facing surface 624 of the trailing shield 504 than a throat height of the main pole 502, which is positioned between the media-facing surface 624 of the main pole 502 and the flare point of the main pole 502 where the main pole begins to increase in width in the cross-track direction. In another embodiment, the first face 620 may be positioned in a range from about 100 nm to about 300 nm from the media-facing surface 624 of the trailing shield 504 in the element height direction 626, such as about 150 nm, 200 nm, 250 nm, etc.

According to another embodiment, the second face 622 may be positioned more than about 450 nm and less than about 2000 nm from the media-facing surface of the trailing shield 504 in the element height direction 626, such as about 500 nm, 750 nm, 1000 nm, or more. This height provides greater protection from magnetic flux to far tracks on the magnetic medium, thereby preventing FTI more effectively than a shorter structure, without increasing the shield excitation near the medium-facing surface 626 of the trailing shield 504 and/or the at least one side shield 506.

In another embodiment, the fifth trailing juncture 616 and the sixth trailing juncture 618 may be positioned in a range from about 50 nm to about 150 nm farther from the trailing side of the main pole 502 than the fourth trailing juncture 614, such as about 75 nm, 100 nm, 125 nm, etc.

Figure 6B:
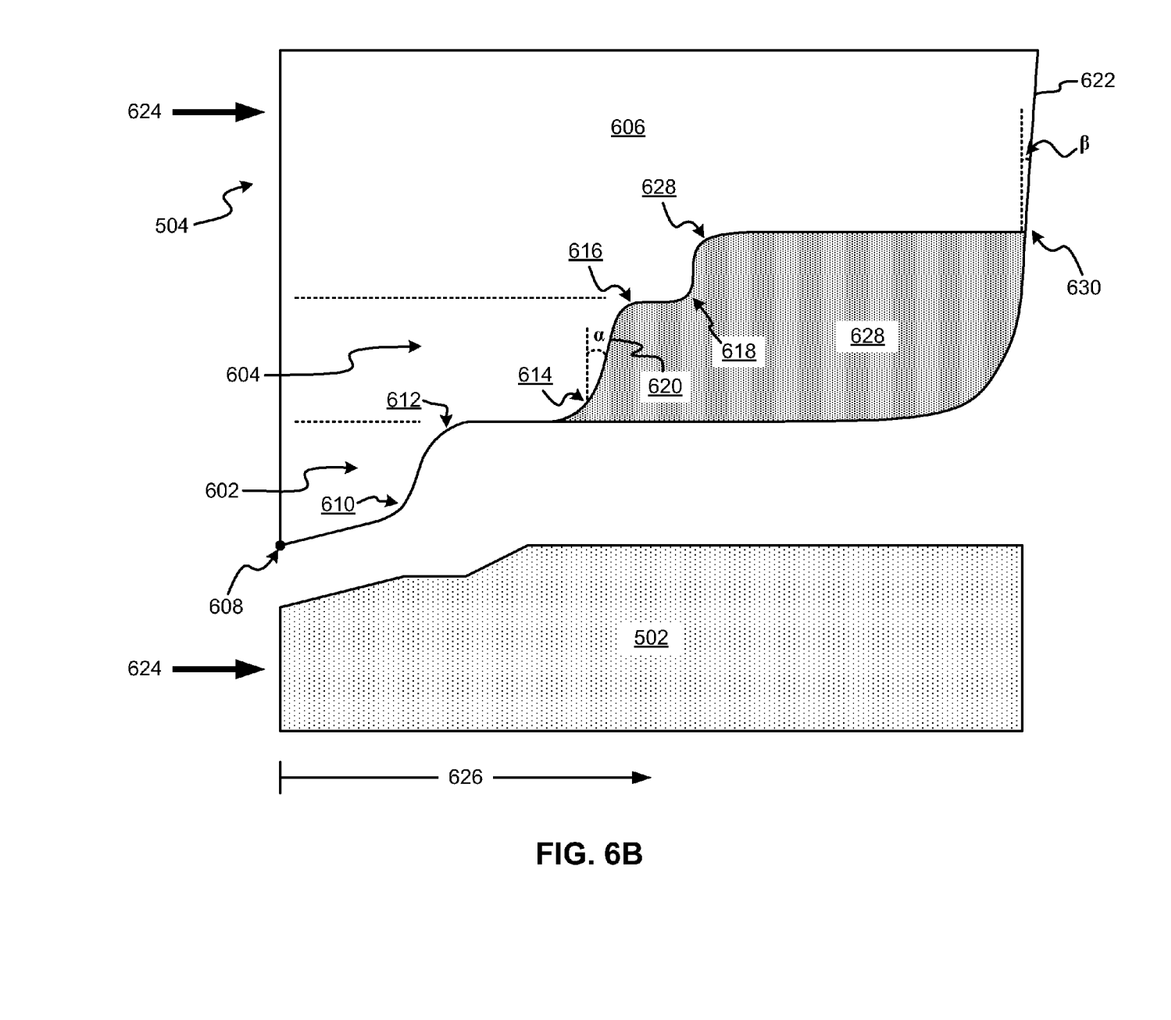
FIG. 6B shows a cross-section of a portion of a magnetic head near a side thereof, according to another embodiment.

Now referring to FIG. 6B, a trailing shield 504 with a multi-bump structure is shown according to another embodiment. In this embodiment, the region defined by some of the trailing junctures are rounded and/or curved. From this figure, it can be seen that some mix of trailing junctures is possible, such as some that define a rounded and/or curved region, and some that define a point between two surfaces of the trailing shield 504.

In addition, as shown in FIG. 6B, the multi-bump structure includes two additional junctures, a seventh trailing juncture 628 and an eighth trailing juncture 630. In this embodiment, the second face 622 of the trailing shield 504 is positioned after the eighth trailing juncture 630.

Figure 7:
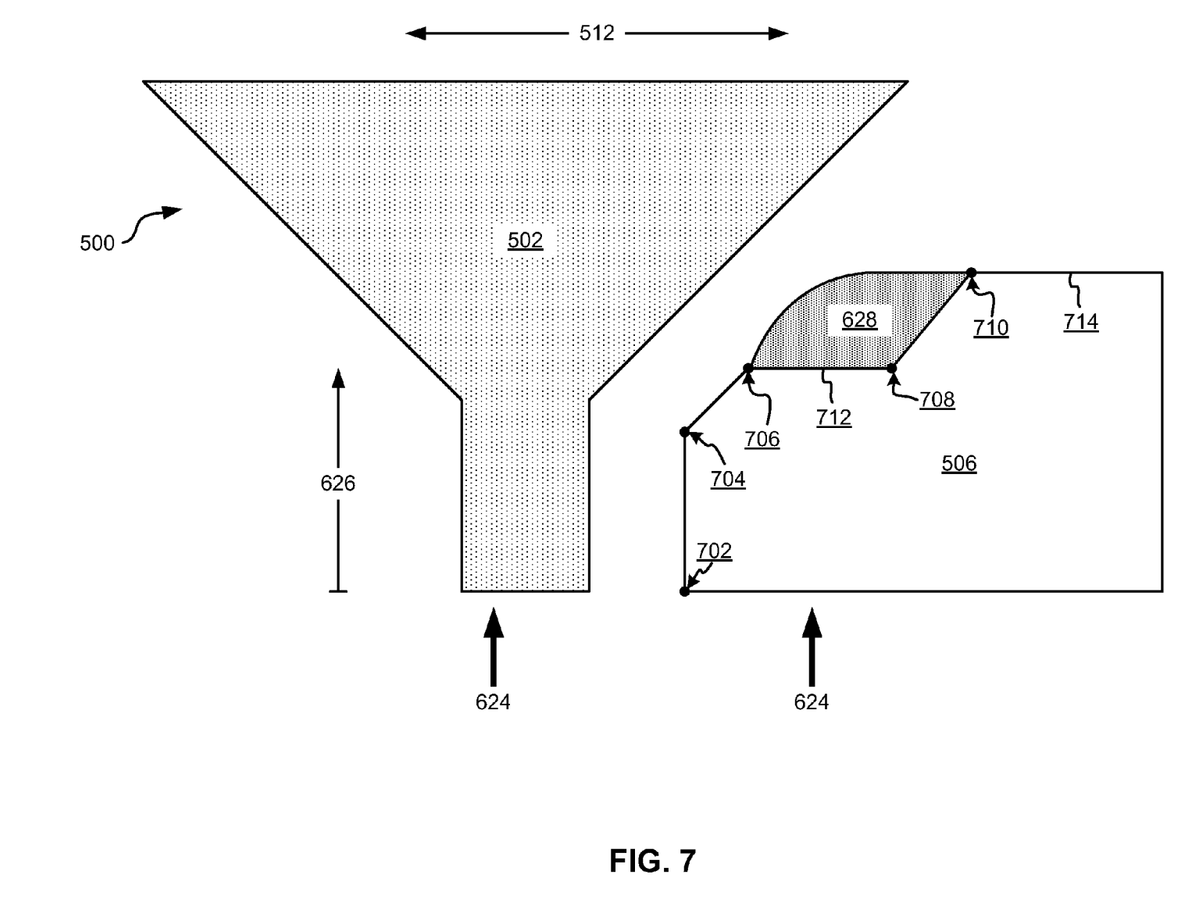
FIG. 7 shows a cross-section of a portion of a magnetic head near a media-facing surface thereof, according to one embodiment.

Now referring to FIG. 7, a cross-section of a portion of the magnetic head 500 near the media-facing surface 624 thereof is shown according to one embodiment. In this embodiment, one side shield 506 having a multi-bump structure is shown, however two side shields may be included in other embodiments, one or both having the multi-bump structure as shown in FIG. 7. In other embodiments, one of the side shields 506 may have a conventional design without a multi-bump structure, while the other side shield 506 has the multi-bump structure as shown. In FIG. 7, a double bump structure is shown; however, any of the multi-bump structures may include two or more bumps.

The multi-bump structure of the side shield 506 is characterized by having at least five side junctures on a side of the at least one side shield 506 facing the main pole 502, each side juncture defining a region or point where two surfaces of the at least one side shield 506 are joined, intersect, connect, etc., according to one embodiment. The first side juncture 702 is positioned at a media-facing surface 624 of the at least one side shield 506, the fifth side juncture 710 is positioned away from the media-facing surface 624 of the at least one side shield 506, and the second side juncture 704, third side juncture 706, and fourth side juncture 708 are positioned along the side of the at least one side shield 506 facing the main pole 502 between the first side juncture 702 and the fifth side juncture 710.

In one embodiment, a first face 712 of the at least one side shield 506 may be positioned between the third side juncture 706 and the fourth side juncture 708, while a second face 714 of the at least one side shield 506 may be positioned at an end of the at least one side shield 506 positioned opposite the media-facing surface 624 of the at least one side shield 506.

In accordance with another embodiment, and as shown in FIG. 7, an element height of the first face 712 of the at least one side shield 506 may be less than an element height of the second face 714 of the at least one side shield 506.

Of course, due to manufacturing process variability and inherent difficulties in forming exact shapes, the first face 712 of the at least one side shield 506 may have some angle with respect to the media-facing surface 624 of the at least one side shield 506, such as an angle from about 0° to about 20°, or more or less, in some approaches. In other embodiments, the second face 714 of the at least one side shield 506 may have some angle with respect to the media-facing surface 624 of the at least one side shield 506, such as an angle from about 0° to about 20°, or more or less, in some approaches. In one embodiment, both angles may be about 0° and within some manufacturing tolerance thereof.

According to one embodiment, part of the at least one side shield 506 may be oriented parallel to a part of the main pole 502 which increases in width in the cross-track direction (above the throat of the main pole 502 after the flare point of the main pole 502 in the element height direction 626).

In one approach, the first face 712 of the at least one side shield 506 may be positioned in a range from about 100 nm to about 300 nm from the media-facing surface 624 of the at least one side shield 506 in the element height direction 626, such as about 150 nm.

In another embodiment, the second face 714 of the at least one side shield 506 may be positioned more than about 450 nm and less than about 2000 nm from the media-facing surface 624 of the at least one side shield 506 in the element height direction 626, such as about 500 nm or more.

In another embodiment, the fourth side juncture 708 and the fifth side juncture 710 may be positioned in a range from about 50 nm to about 150 nm farther from one or more sides of the main pole 502 in the cross-track direction than the third side juncture 706.

According to one embodiment, a bump layer 628 may be provided adjacent the at least one side shield 506 along a side thereof positioned toward the main pole 502, and may act to help form the stepped multi-bump structure of the at least one side shield 506, in one embodiment. The bump layer 628 may comprise any non-magnetic insulating material, such as alumina, MgO, $Ta_2O_5$, etc.

In another embodiment, electroless nickel may be used for the bump layer 628, the electroless nickel comprising a nickel alloy, such as NiP, NiB, NiPX, where X is one or more of Cu, W, Mo, Sn, etc., such that the bump layer 628 may be plated onto the gap layer located therebelow in the formation process.

The at least one side shield 506 with a multi-bump structure may have side junctures that define a point (as shown) or a region. In one embodiment, the region defined by some of the side junctures may be rounded and/or curved.

Any of the embodiments described herein may be used in a magnetic data storage system, such as that shown in FIG. 1. In any of these embodiments, the magnetic data storage system 100 may comprise at least one magnetic head 500 as described herein according to various embodiments in FIGS. 5-7, a magnetic medium 112 as shown in FIG. 1, a drive mechanism 118 for passing the magnetic medium 112 over the at least one magnetic head 500, and a controller 129 electrically coupled to the at least one magnetic head 500 for controlling operation of the at least one magnetic head 500.

Figure 8:
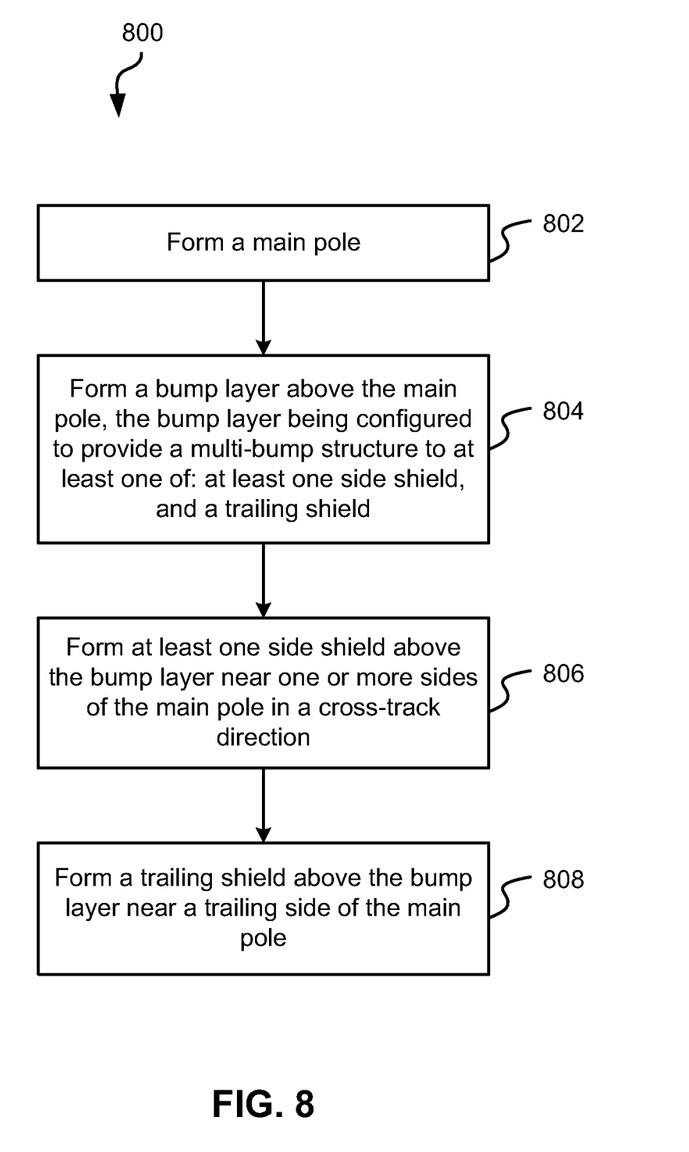
FIG. 8 shows a flowchart of a method according to one embodiment.

FIG. 8 shows a method 800 for forming a magnetic head in accordance with one embodiment. As an option, the present method 800 may be implemented to construct structures such as those shown in FIGS. 1-7. Of course, however, this method 800 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

In operation 802, a main pole is formed using any material(s) and/or formation technique known in the art. for example, the main pole may comprise CoFe, NiFe, CoFePt, or some other suitable material, and may be plated, sputtered, etched, etc.

In operation 804, a bump layer is formed above the main pole. The bump layer is positioned near a pole tip of the main pole commensurate with the trailing shield and the at least one side shield (which will be formed in operations 806 and 808). Also, the bump layer is configured to provide a multi-bump structure to at least one of: the at least one side shield, and the trailing shield. This multi-bump structure may comprise two or more bumps, as described in more detail herein.

In a further embodiment, the multi-bump structure may be provided to both of the trailing shield and the at least one side shield. In an even further embodiment, the multi-bump structure may be provided to all of the trailing shield and two side shields positioned on both sides of the main pole in the cross-track direction.

According to various embodiments, the bump layer may comprise a non-magnetic insulating material, possibly a material having a high electrical resistivity in comparison with CoFe, such as alumina, MgO, $Ta_2O_5$, etc. In other embodiments, electroless nickel may be used for the bump layer, the electroless nickel comprising a nickel alloy, such as NiP, NiB, NiPX, where X is one or more of Cu, W, Mo, Sn, etc.

In operation 806, at least one side shield is formed above the bump layer near one or more sides of the main pole in the cross-track direction. Any material(s) and/or formation technique known in the art may be used to form the at least one side shield. For example, the at least one side shield may comprise CoFe, NiFe, CoFePt, or some other suitable material, and may be plated, sputtered, etched, etc.

In operation 808, a trailing shield is formed above the bump layer near a trailing side of the main pole. Any material(s) and/or formation technique known in the art may be used to form the trailing shield. For example, the trailing shield may comprise CoFe, NiFe, CoFePt, or some other suitable material, and may be plated, sputtered, etched, etc.

In one embodiment, two side shields are formed, one on each side of the main pole in the cross-track direction. Furthermore, both side shields may have a multi-bump structure.

In another embodiment, the trailing shield and the at least one side shield may be formed in a single formation process using the same magnetic material configured to shunt magnetic flux from the main pole. In this or any other embodiment, the trailing shield and the at least one side shield together may form a wrap around shield.

It should be noted that methodology presented herein for at least some of the various embodiments may be implemented, in whole or in part, in computer hardware, software, by hand, using specialty equipment, etc. and combinations thereof. Moreover, any of the structures and/or steps may be implemented using known materials and/or techniques, as would become apparent to one skilled in the art upon reading the present specification.

By using the multi-bump structure as described herein according to various embodiments for the trailing shield and the side shields in a wrap around shield design, the excitation of the wrap around shield at the media-facing surface thereof may be reduced by about 20% compared to conventional designs. This is thought to be due to the magnetic flux from the main pole being shunted while enough separation is provided between the wrap around shield and the main pole to maintain efficiency.

Figure 9:
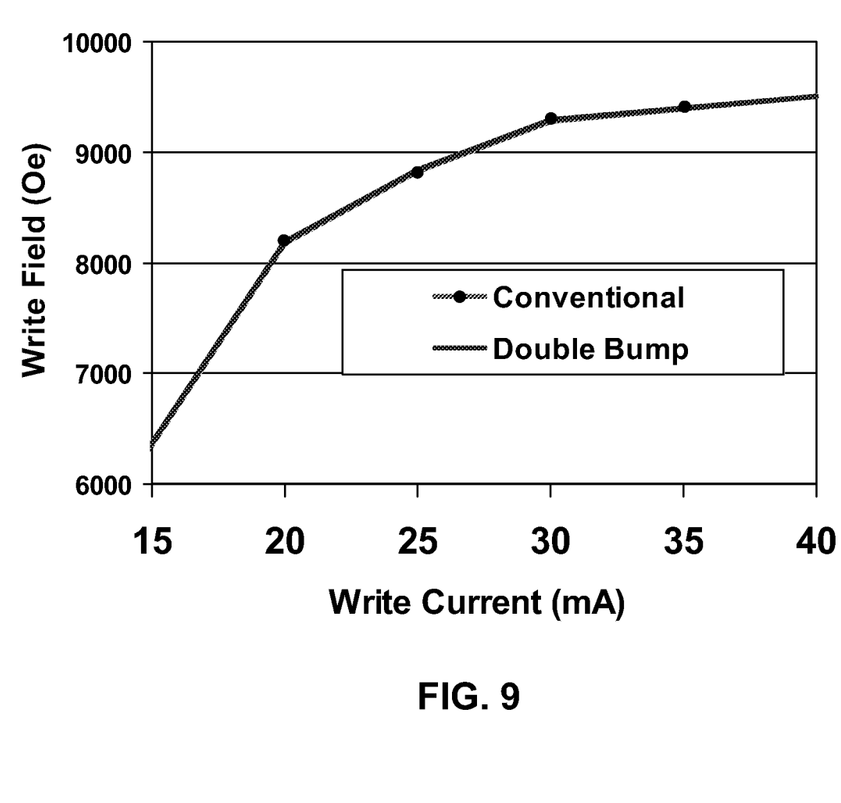
FIG. 9 shows a chart plotting write efficiency for a conventional wrap around shield design and a double bump wrap around shield design.

As can be seen in FIG. 9, a chart of the write field versus the write current for a conventional wrap around shield design and the multi-bump (specifically a double bump) wrap around shield design described herein, there is an indiscernible difference in write efficiency between the two designs, e.g., the double bump structure does not reduce the efficiency of a write head using this design versus conventional designs.

Figure 10:
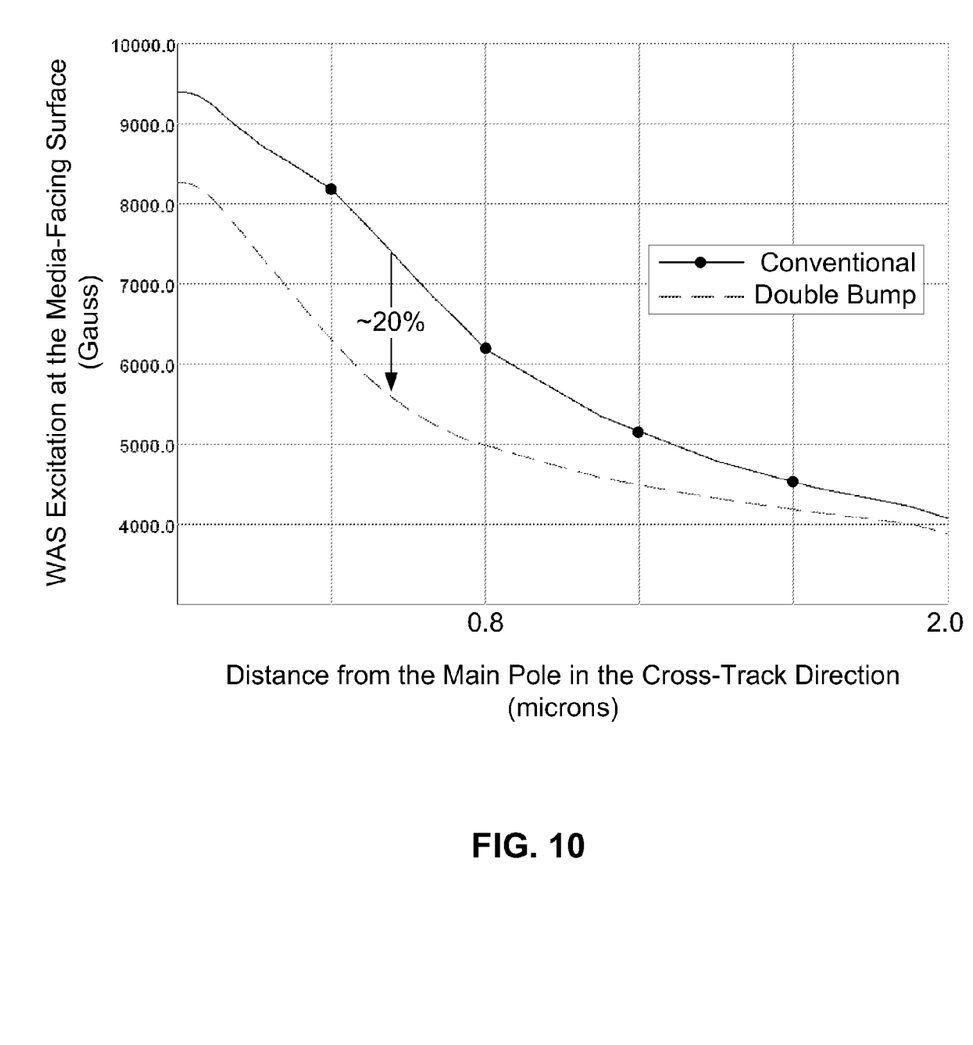
FIG. 10 shows a chart plotting wrap around shield excitation for a conventional wrap around shield design and a double bump wrap around shield design.

Then, as can be seen in FIG. 10, the wrap around shield excitation is shown for a conventional wrap around shield design and the double bump wrap around shield design described herein. As can be seen, the wrap around shield excitation is reduced by about 20% for the double bump wrap around shield design described herein in comparison to the conventional design.

Other experiments with a write head utilizing a double bump wrap around shield as described herein show that FTI and ATI are also reduced in comparison to a conventional wrap around shield design. This observation was made at both random (frequencies between about 200 MHz and about 700 MHz) and low frequency (about 200 MHz) stress conditions.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
    a main pole;
    at least one side shield positioned near one or more sides of the main pole in a cross-track direction; and
    a trailing shield positioned near a trailing side of the main pole,
    wherein the trailing shield comprises a multi-bump structure having at least six trailing junctures on a side of the trailing shield facing the main pole, each trailing juncture defining a region where two surfaces of the trailing shield are joined,
    wherein a first trailing juncture is positioned at a media-facing surface of the trailing shield, a sixth trailing juncture is positioned away from the media-facing surface of the trailing shield, and second, third, fourth, and fifth trailing junctures are positioned along the side of the trailing shield facing the main pole between the first trailing juncture and the sixth trailing juncture,
    wherein a first face of the trailing shield is positioned between the fourth trailing juncture and the fifth trailing juncture,
    wherein a second face of the trailing shield is positioned at an end of the trailing shield positioned opposite the media-facing surface of the trailing shield, and
    wherein an element height of the first face of the trailing shield is less than an element height of the second face.

2. The apparatus as recited in claim 1, further comprising:
    a trailing gap positioned between the trailing shield and the main pole on the trailing side of the main pole; and
    at least one side gap positioned between the at least one side shield and the main pole on the one or more sides of the main pole in the cross-track direction,
    wherein the trailing gap and the at least one side gap comprise a non-magnetic insulating material.

3. The apparatus as recited in claim 1, wherein part of the at least one side shield is oriented parallel to a part of the main pole which increases in width in the cross-track direction.

4. The apparatus as recited in claim 1, wherein part of the trailing shield is oriented parallel to a trailing side of a throat of the main pole positioned closest to the media-facing surface of the main pole.

5. The apparatus as recited in claim 1, further comprising two side shields, wherein a side shield is positioned near each side of the main pole in the cross-track direction, wherein the two side shields and the trailing shield together form a wrap around shield.

6. The apparatus as recited in claim 1, wherein the first face is positioned farther from the media-facing surface of the trailing shield than a throat height of the main pole.

7. The apparatus as recited in claim 1, wherein the first face is positioned in a range from about 100 nm to about 300 nm from the media-facing surface of the trailing shield, and wherein the second face is positioned more than about 450 nm and less than about 2000 nm from the media-facing surface of the trailing shield.

8. The apparatus as recited in claim 1, wherein the fifth trailing juncture and the sixth trailing juncture are positioned in a range from about 50 nm to about 150 nm farther from the trailing side of the main pole than the fourth trailing juncture.

9. The apparatus as recited in claim 1, wherein the at least one side shield comprises a multi-bump structure having at least five side junctures on a side of the at least one side shield facing the main pole, each side juncture defining a region where two surfaces of the at least one side shield are joined,
    wherein a first side juncture is positioned at a media-facing surface of the at least one side shield, a fifth side juncture is positioned away from the media-facing surface of the at least one side shield, and second, third, and fourth side junctures are positioned along the side of the at least one side shield facing the main pole between the first side juncture and the fifth side juncture,
    wherein a first face of the at least one side shield is positioned between the third side juncture and the fourth side juncture,
    wherein a second face of the at least one side shield is positioned at an end of the at least one side shield positioned opposite the media-facing surface of the at least one side shield, and
    wherein an element height of the first face of the at least one side shield is less than an element height of the second face of the at least one side shield.

10. The apparatus as recited in claim 9, further comprising two side shields, wherein a side shield is positioned near each side of the main pole in the cross-track direction, wherein the two side shields and the trailing shield together form a wrap around shield.

11. The apparatus as recited in claim 9, wherein the first face of the at least one side shield is positioned in a range from about 100 nm to about 300 nm from the media-facing surface of the at least one side shield, and wherein the second face of the at least one side shield is positioned more than about 450 nm and less than about 2000 nm from the media-facing surface of the at least one side shield.

12. The apparatus as recited in claim 9, wherein the fourth side juncture and the fifth side juncture are positioned in a range from about 50 nm to about 150 nm farther from one or more sides of the main pole in the cross-track direction than the third side juncture.

13. The apparatus as recited in claim 9, wherein the region defined by at least one of the side junctures is curved and/or rounded, and wherein the multi-bump structure further comprises a sixth side juncture and a seventh side juncture positioned on the side of the at least one side shield facing the main pole.

14. The apparatus as recited in claim 1, wherein the region defined by at least one of the trailing junctures is curved and/or rounded.

15. The apparatus as recited in claim 1, wherein the multi-bump structure further comprises a seventh trailing juncture and an eighth trailing juncture positioned on the side of the trailing shield facing the main pole.

16. A magnetic data storage system, comprising:
at least one apparatus as recited in claim 1;
the magnetic medium;
a drive mechanism for passing the magnetic medium over the at least one apparatus; and
a controller electrically coupled to the at least one apparatus for controlling operation of the at least one apparatus.

17. A magnetic head, comprising:
a main pole;
at least one side shield positioned near one or more sides of the main pole in a cross-track direction; and
a trailing shield positioned near a trailing side of the main pole,
wherein the at least one side shield comprises a multi-bump structure having at least five side junctures on a side of the at least one side shield facing the main pole, each side juncture defining a region where two surfaces of the at least one side shield are joined,
wherein a first side juncture is positioned at a media-facing surface of the at least one side shield, a fifth side juncture is positioned away from the media-facing surface of the at least one side shield, and second, third, and fourth side junctures are positioned along the side of the at least one side shield facing the main pole between the first side juncture and the fifth side juncture,
wherein a first face of the at least one side shield is positioned between the third side juncture and the fourth side juncture,
wherein a second face of the at least one side shield is positioned at an end of the at least one side shield positioned opposite the media-facing surface of the at least one side shield, and
wherein an element height of the first face of the at least one side shield is less than an element height of the second face of the at least one side shield.

18. A method for forming a magnetic head, the method comprising:
forming a main pole;
forming a bump layer above the main pole;
forming at least one side shield above the bump layer near one or more sides of the main pole in a cross-track direction; and
forming a trailing shield above the bump layer near a trailing side of the main pole,
wherein the bump layer is positioned near a pole tip of the main pole commensurate with the trailing shield and the at least one side shield, and
wherein the bump layer is configured to provide a multi-bump structure to at least one of: the at least one side shield, and the trailing shield.

19. The method as recited in claim 18, wherein the trailing shield and the at least one side shield are formed in a single formation process using a magnetic material configured to shunt magnetic flux from the main pole.

20. The method as recited in claim 18, wherein the trailing shield and the at least one side shield together form a wrap around shield.

\* \* \* \* \*